No. 617,447. Patented Jan. 10, 1899.
N. RAPP & R. RAPP, Jr.
MECHANICAL MOVEMENT AND BICYCLE GEAR.
(Application filed Dec. 6, 1897.)
(No Model.)
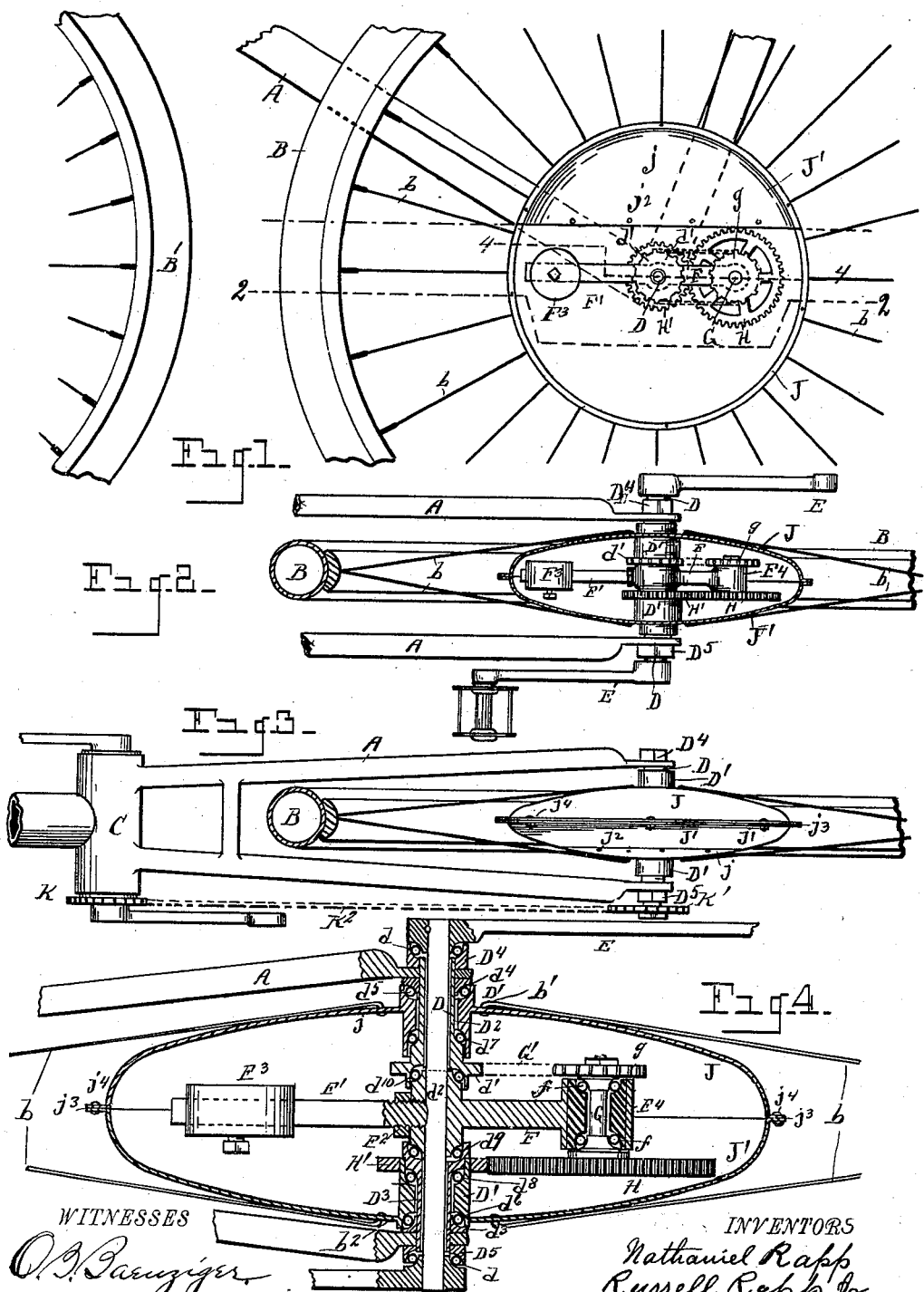

UNITED STATES PATENT OFFICE.

NATHANIEL RAPP AND RUSSELL RAPP, JR., OF DETROIT, MICHIGAN, ASSIGNORS OF ONE-HALF TO WILLIAM B. DENNEE AND ROBERT A. BRACHVOGEL, OF SAME PLACE.

MECHANICAL MOVEMENT AND BICYCLE-GEAR.

SPECIFICATION forming part of Letters Patent No. 617,447, dated January 10, 1899.

Application filed December 6, 1897. Serial No. 660,932. (No model.)

*To all whom it may concern:*

Be it known that we, NATHANIEL RAPP and RUSSELL RAPP, Jr., citizens of the United States, residing at Detroit, county of Wayne, State of Michigan, have invented a certain new and useful Improvement in a Novel Mechanical Movement and Bicycle-Gear; and we declare the following to be a full, clear, and exact description of the invention, such as will enable others skilled in the art to which it appertains to make and use the same, reference being had to the accompanying drawings, which form a part of this specification.

Our invention has for its object a novel mechanical movement, and particularly a novel gear for bicycles and other uses for which it may be found adapted.

Our invention consists of the construction, combination, and arrangement of devices hereinafter described and claimed, and illustrated in the accompanying drawings, in which—

Figure 1 is a view showing portions of a bicycle in side elevation embodying features of our invention. Fig. 2 is a horizontal section on the line 2 2, Fig. 1. Fig. 3 is a plan view illustrating a modification; and Fig. 4 is a horizontal section on the line 4 4, Fig. 1.

Our invention as applied to bicycles aims to provide a high-speed gear requiring less power than wheels intended for such purposes as heretofore constructed.

Our invention aims also as one feature thereof to provide gear dispensing with the ordinary sprocket wheels and chain, making what might be termed a "chainless" gear, although a short internal sprocket-chain is employed, but not connected with the crank-shaft.

Our invention also contemplates the general features embodied in the drawings and specification.

We carry out our invention as follows: A represents any suitable framework of a bicycle, and B represents portions of a rear wheel.

C is a crank-hanger.

B' is a portion of the front wheel.

D is the axle of the rear wheel.

D' and D' represent hubs upon the axle of the rear wheel, and $D^2$ and $D^3$ represent sleeves between said hubs, respectively, and the axle.

$D^4$ and $D^5$ represent cones or nuts located toward the extremities of the shafts, said cones respectively having a screw-threaded engagement upon the corresponding sleeves $D^2 D^3$ outside the framework of the machine.

E represents the pedal-cranks, which in the mechanism shown in Figs. 1, 2, and 4 are engaged upon the extremities of the axle of the rear wheel, ball-bearings (indicated at $d$) being provided between said cranks and the adjacent cones. One of the sleeves, as the sleeve $D^2$, is provided with a sprocket-wheel (indicated at $d'$ in Figs. 2 and 4) of small diameter. Between the sleeves $D^2$ and $D^3$ and their respective hubs and upon the axle D is located a rotatable arm F, said arm being made fast on the axle, as by a counterbalance-arm F', having a threaded engagement in the hub of the arm F, the inner end of the counterbalance-arm projecting slightly into a recess, (indicated at $d^2$.)

$F^2$ is a jam-nut engaged upon the inner end of the arm F' to lock said arm in place.

$F^3$ is a counterbalance-weight on the outer end of the arm F'.

The outer end of the arm F is provided with a hollow bearing $F^4$, in which is located an axle G, carrying at one extremity a sprocket-gear $g$ in line with the sprocket-wheel $d'$, a chain G' (indicated in dotted lines) being engaged upon said sprocket-wheels. Upon the opposite extremity of the axle G is a gear H, meshing with a gear H' upon one of the hubs, as upon the hub D', and rotatable therewith. The sprocket $d'$ has a fixed engagement with its sleeve and is non-rotatable.

It will be evident that as the axle D is rotated it carries the arms F and F' therewith, causing said arms to rotate and carry the axle G around about the axle D. The gears $g$ and H have a fixed engagement upon the axle G, said axle having a rotatable engagement in the bearing $F^4$, ball-bearings $f$ being provided. Additional cones $d^3$ and $d^4$ are provided adjacent to the inner surfaces of the forks of the framework engaging the axle, between which cones and the adjacent hubs are ball-bearings $d^5$ and $d^6$; also, between the inner portions of the hubs and the corresponding portions of the adjacent sleeves are preferably provided ball-bearings $d^7$ and $d^8$. Other ball-bearings $d^9$ and $d^{10}$ are provided between the hub of the arm F and the gear $d'$ and H'.

It will be perceived that as the rear axle D is rotated by means of the pedals the arms F and F' are rotated therewith, carrying the bearing $F^4$ therewith, thereby causing the gear $g$ and H to have a planet movement about the axle D, the shaft or axle G, as already observed, rotating in the bearing $F^4$, the gear H in mesh with the gear H', and the sprocket-gear $g$ connected by the sprocket-chain G' with the gear $d'$. The sprocket $d'$, being stationary on its sleeve, causes the rotation of the sprocket $g$, thereby rotating the axle G and the gear H, together with the gear H'. The counterbalance $F^3$ is simply intended to counterbalance the weight of the devices carried by the bearing $F^4$, so as to more fully equalize the movement of the parts. The gear H' is made of smaller diameter than the gear H, meshing therewith, by which means a high rate of speed may be obtained. It will be apparent that the chain G' simply swings about the stationary bracket-wheel $d'$, causing little or no friction in its contact with the sprocket-wheel $d'$, in consequence of which no power is diminished, as where both sprocket-wheels as customarily made are rotatable. Power is thereby saved for the propulsion of the gear H' and its hub.

In a bicycle we provide a cover, preferably a divided cover, composed of two parts, (indicated at J and J',) said covers being engaged with the corresponding hubs. The spokes $v$ of the wheel are also engaged with the corresponding hubs and preferably also with the corresponding portions of said covers, as indicated at $b'$ and $b^2$. We prefer that one of the portions J and J' of the covers should also be divided, the portion J', for example, being provided with a removable portion $j$, with which the remaining portion should have a removable connection, as by bolts $j^2$. The two cover portions J J' may be provided with peripheral flanges, (indicated at $j^3$,) through which bolts $j^4$ may be passed to unite the covers together. By this construction access may be had in a convenient manner to the interior features of the mechanism by simply removing the portion J at one side of the device. The engagement of the two portions of the cover upon the corresponding hubs also has an important function to hold said hubs from any movement longitudinally of the axle. The covers serve also to unite the two hubs and distribute the force in driving the wheel.

It will be perceived that should the gear H' be half the diameter of the gear H the meshing of said gears alone, did the gear H have no planetary movement, would cause the gear H' to travel twice as rapidly as the gear H; but in addition, in consequence of the gear H having a planetary movement about the gear H', an additional complete revolution of the gear H' is obtained at every revolution of the gear H with its axle, so that an additional rotation of the gear H' is secured by the planetary movement of the gear H over what would be secured had the gear H no planetary movement. Figs. 2 and 4 more particularly show the pedal-cranks engaged upon the axle of the rear wheel. The features of our invention, however, contemplate the customary engagement of the pedals upon the shaft carried by the crank-hanger C, as indicated in Fig. 3, as coming within its scope, the shaft in said hanger being provided with a sprocket-wheel K and the rear axle with a sprocket-wheel K', the sprocket-wheels K and K' being connected by a sprocket-chain $K^2$.

In Fig. 3 the covers J and J' are shown in plan, it being noted that the interior mechanism is similar to that shown and described in Fig. 4. As applied to a bicycle the mechanism described and shown within said covers J and J' is carried upon the main axle D, the axle G being an additional auxiliary shaft or axle. The same mechanism might be employed for other purposes than those relating to bicycles. When the pedal-cranks are attached to the axle of the rear wheel, the crank-hanger and its shaft may be entirely omitted, in which case the framework connecting the rear and front wheels may be considerably shortened, bringing the front wheel nearer to the rear wheel, as indicated in Fig. 1. By such a construction the rear forks of the ordinary frame may be entirely omitted, materially diminishing the cost of the construction of the frame and making the bicycle of lighter weight.

What we claim as our invention is—

1. The axle, the two sleeves applied to the axle at opposite ends and secured to the frame of the cycle, the two-part hub revolving upon said sleeves, and the wheel secured thereto, combined with a sprocket-wheel secured to one end of one of said sleeves, a gear-wheel secured to the end of one of the parts of the hub, a weighted arm secured to the axle, a shaft revolving in one end of said arm and having secured to each of its ends a wheel, one of said wheels being connected by a chain to the wheel upon the end of one of the sleeves, and the other wheel being made to mesh with the wheel upon the inner end of one of the parts of the hub, substantially as shown.

2. The axle D, the sleeves $D^2$, $D^3$ applied to the opposite ends thereof and secured to the frame of the cycle, the sleeve $D^2$ being provided with the sprocket-wheel D' upon its inner end; and the weighted counterbalanced arm F F' secured to the shaft, one of the ends of the arms being made perforated; combined with the shaft G which passes through the perforation in said arm, the sprocket-wheel $g$, the gear-wheel H, the hub composed of two parts which revolve upon the sleeves, one of the parts being provided with a wheel H' with which the large wheel H meshes; and the wheel B which is secured to the two-part hub, substantially as specified.

In testimony whereof we sign this specification in the presence of two witnesses.

NATHANIEL RAPP.
RUSSELL RAPP, JR.

Witnesses:
N. S. WRIGHT,
MARY HICKEY.